United States Patent [19]
Butt et al.

[11] Patent Number: 5,625,940
[45] Date of Patent: May 6, 1997

[54] ROBOT COMPLIANCE DEVICE

[75] Inventors: Thomas Butt, Breslau, Canada; Jim Herring, Rochester Hill, Mich.

[73] Assignee: Budd Canada Inc., Kitchener, Canada

[21] Appl. No.: 395,809

[22] Filed: Feb. 28, 1995

[51] Int. Cl.[6] .................................................. B63Q 16/00
[52] U.S. Cl. .................................. 29/709; 29/715; 33/626; 403/59; 901/45; 901/49
[58] Field of Search .................... 29/709, 715; 33/626, 33/644; 403/53, 57, 59, 113, 121; 414/730, 735; 901/29, 45, 49

[56] References Cited

U.S. PATENT DOCUMENTS

| | | | |
|---|---|---|---|
| 4,517,744 | 5/1985 | Consales et al. | 33/626 X |
| 4,595,334 | 6/1986 | Sharon | 414/735 |
| 4,669,192 | 6/1987 | Matheson et al. | |
| 4,700,932 | 10/1987 | Katsuno | 901/49 X |
| 4,741,642 | 5/1988 | Carlton | 901/29 X |
| 4,801,240 | 1/1989 | Hautau et al. | |
| 4,820,114 | 4/1989 | Inaba et al. | |
| 4,954,005 | 9/1990 | Knasel et al. | |

*Primary Examiner*—S. Thomas Hughes
*Attorney, Agent, or Firm*—Harness, Dickey & Pierce, P.L.C.

[57] ABSTRACT

A compliance device for robot assemblies is provided which permits the automation of tooling operations that generate significant reaction loads, such as automatic riveting and the like. The compliance device includes a compliance control assembly and a tool isolation assembly. The compliance control assembly is an air cylinder having a tubular piston rod. An elongated shaft extends through the tubular piston rod and an axial bore in the piston of the air cylinder. The shaft is affixed to an end plate of the cylinder and includes a position locator cone affixed to its free end. The position locator cone is housed in the tool isolation assembly which is a cylindrical housing having a tool support end and a position locator end. Equally spaced-apart, radially-oriented rollers are affixed to an inside surface of the locator end of the tool isolation assembly. The rollers cooperate with detent grooves formed in a top surface of the position locator cone to locate the tool isolation assembly in a predetermined home position when air pressure is injected into the compliance control assembly and the tubular piston rod is extended to force the rollers into the detent grooves. Air is exhausted from the compliance control assembly during tool operations so that the tool isolation assembly is free to move in response to reaction loads created by the tool operation. The advantage of the compliance device is that it provides a robust compliance device that reliably returns to a precise predefined home position and permits the automation of heavy tool operations such as riveting.

18 Claims, 3 Drawing Sheets

ROBOT COMPLIANCE DEVICE

FIELD OF THE INVENTION

The present invention relates to compliance devices for robot assemblies and in particular to a robust compliance device that permits the automation of tooling operations that generate significant reaction loads, such as automated riveting and the like.

BACKGROUND OF THE INVENTION

Robots are commonly used in the assembly of mechanical parts as well as certain tooling operations. Robots are driven by precision gears and joints which must be protected from excessive mechanical stress in order to ensure a long service life. Most tooling operations generate a certain amount of torque. Some tooling operations, such as a riveting operation, also generate axial and eccentric loads on the tool. A robot operating a tool must be isolated from those loads to the greatest extent possible. In order to isolate a robot from the axial, eccentric and moment loads generated while operating a tool such as a riveting tool, it is necessary to release the tool from a rigid connection with the robot during the rivet upsetting operation. After rivet upsetting is complete, however, it is necessary to return the riveting tool to a rigid connection with the robot in a predetermined home position so that the tool can be accurately relocated to the next riveting coordinates. Since even large rivets are generally less than one centimetre in diameter, extreme accuracy in positioning the riveting tool is required. Such accuracy can only be achieved if the compliance device is capable of repeatedly relocating the tool to a precise predetermined home position.

Many compliance devices have been designed and constructed using metallic springs to absorb tool reaction loads and to return a tool to a home position after a tool operation. While such compliance devices have proven suitable for light duty work, observation has shown that they do not function effectively for heavy tool operations such as riveting. Springs are also undesirable because they fatigue and therefore require frequent adjustment when used in heavy tool applications.

Compliance devices which use fluid springs have also been invented. U.S. Pat. No. 4,669,192 to Matheson et al. entitled Variable Compliance Device teaches a variable compliance control assembly for use in automatic assembly operations. The variable compliance control assembly includes a housing having an interior chamber and a base member positioned on the surface of the interior chamber. The base member is movable in multidirectional fashion. A fluid spring controls the movement of the base member and returns the base member to a normal, self-centering seated position after a robot operation. A disadvantage of this device is that while it isolates a robot from axial and eccentric loads, it does not isolate the robot from moment loads because a fixed pin which rides in a groove in the base member prevents rotational movement of the base member. The device therefore appears to be unsuitable for heavy tool applications such as riveting that can generate significant moment loads when a rivet is upset by a riveting tool.

It is an object of the invention to provide a robust compliance device a robot that isolates the robot from a substantial part of the loads induced by heavy tool operations and reliably returns a robot tool to a predefined home position after a tool operation is completed.

It is a particular object of the invention to provide a compliance device for a robot which is suitable for use in automated riveting operations.

SUMMARY OF THE INVENTION

In accordance with the invention there is provided a compliance device for a robot to isolate the robot from mechanical loads induced by an operation of a tool operated by the robot, and to return the tool to a predetermined home position after a tool operation, comprising:

a tool isolation assembly having a tool attachment end and a position locator end, the position locator end including an aperture;

a position locator means for cooperating with the position locator end to return the tool isolation assembly to the predetermined home position, the position locator means having first and second ends and a portion intermediate the first and second ends which passes through the aperture, the second end permitting limited movement of the tool attachment end in any direction except past the second end, and the second end having a surface adjacent the aperture which includes position index means for locating the tool isolation assembly in the predetermined home position, the position index means being cooperative with complementary position index means located on an adjacent surface of the position locator end of the tool isolation assembly; and compliance control means for applying mechanical pressure on the position locator end of the tool isolation assembly to force the complementary position index means to cooperatively return the tool isolation assembly to a predetermined home position after the tool operation, and for releasing mechanical pressure from the locator end of the tool isolation assembly to disengage the complementary position index means and permit limited reaction movement or the tool isolation assembly during tool operations.

In accordance with the preferred embodiment of the invention, the compliance control means comprises a fluid cylinder, preferably a pneumatic cylinder, provided with a piston and a tubular piston rod. An axial bore pierces the piston and the bore accommodates a shaft of the position locator means. The shaft of the position locator means is preferably attached to a base plate of the fluid cylinder. The shaft extends through the tubular piston rod and through an aperture in the tool isolation assembly. A position locator cone is affixed to the free end of the shalt.

The tool isolation assembly is preferably an enclosed cylinder to prevent the accumulation of dust and debris on the position index means. The cylindrical tool isolation assembly houses the position locator cone. The position locator cone preferably has a top surface which includes six planes oriented at an obtuse angle with respect to the axis of the shaft. The planes are arranged in pairs, on opposite sides of three detent grooves. Affixed in equally spaced apart relationship to the inside surface of the position locator end of the tool isolation assembly are three rollers located in radial orientation with respect to the shaft. The roller and detent groove arrangement is the preferred position index means in accordance with the invention. The rollers are located in the respective detent grooves when the compliance device is in its home position.

BRIEF DESCRIPTION OF THE DRAWINGS

The invention will now be explained by way of example only and with reference to the following drawings, wherein.

DETAILED DESCRIPTION OF THE PREFERRED EMBODIMENTS

Figure 1:
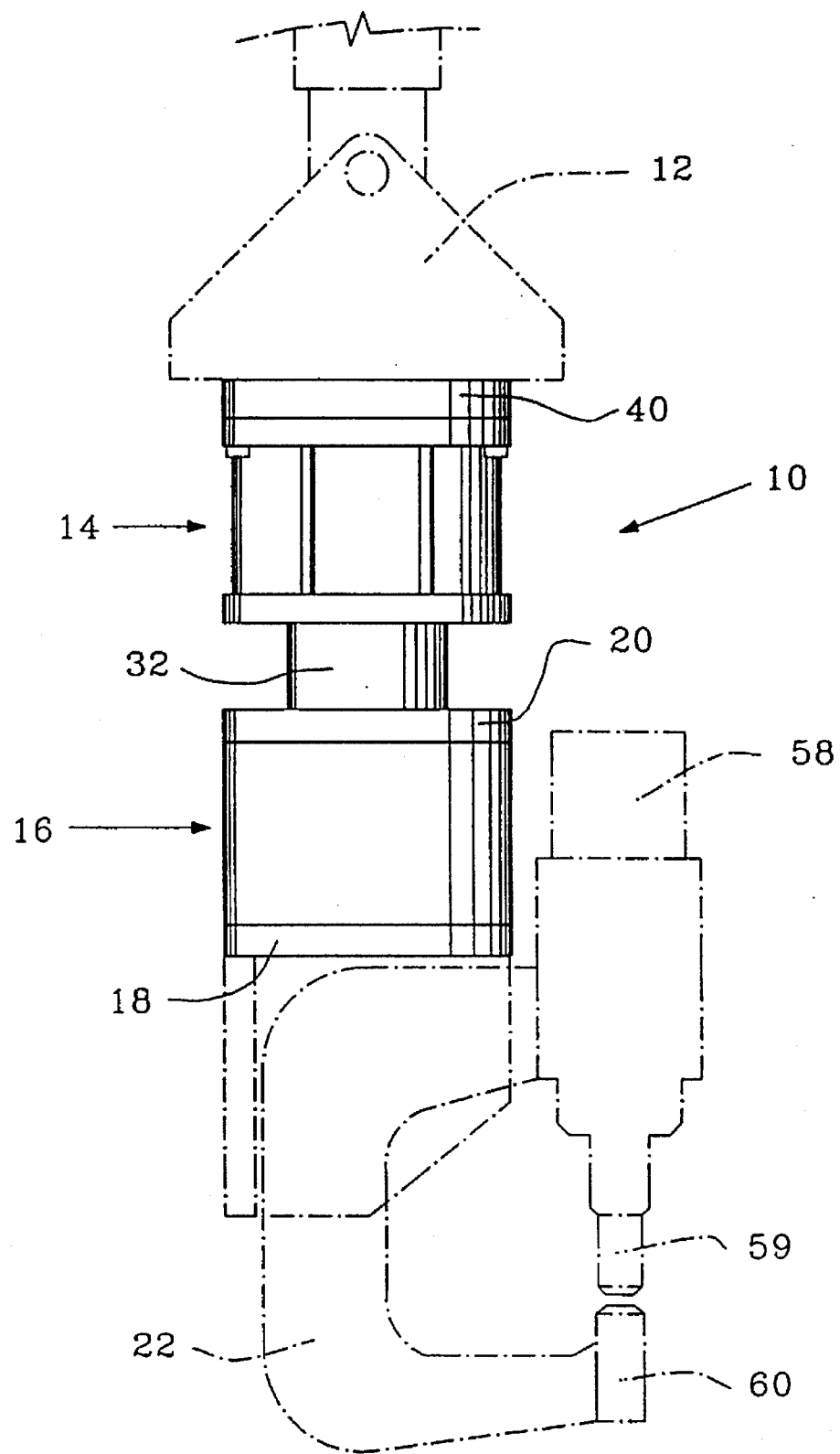
FIG. 1 is a side elevational view of a compliance device in accordance with the invention.

FIG. 1 shows a compliance device in accordance with the invention, generally indicated by reference 10, for robot assemblies. The compliance device 10 is attached to a robot 12, a portion of which is illustrated in phantom lines. The compliance device includes a compliance control assembly, generally indicated by reference 14, and a tool isolation assembly generally indicated by reference 16. The tool isolation assembly 16 has a tool support end 18 and a position locator end 20. Attached to the tool support end 18 is a riveting tool 22 shown in phantom lines.

Figure 2:
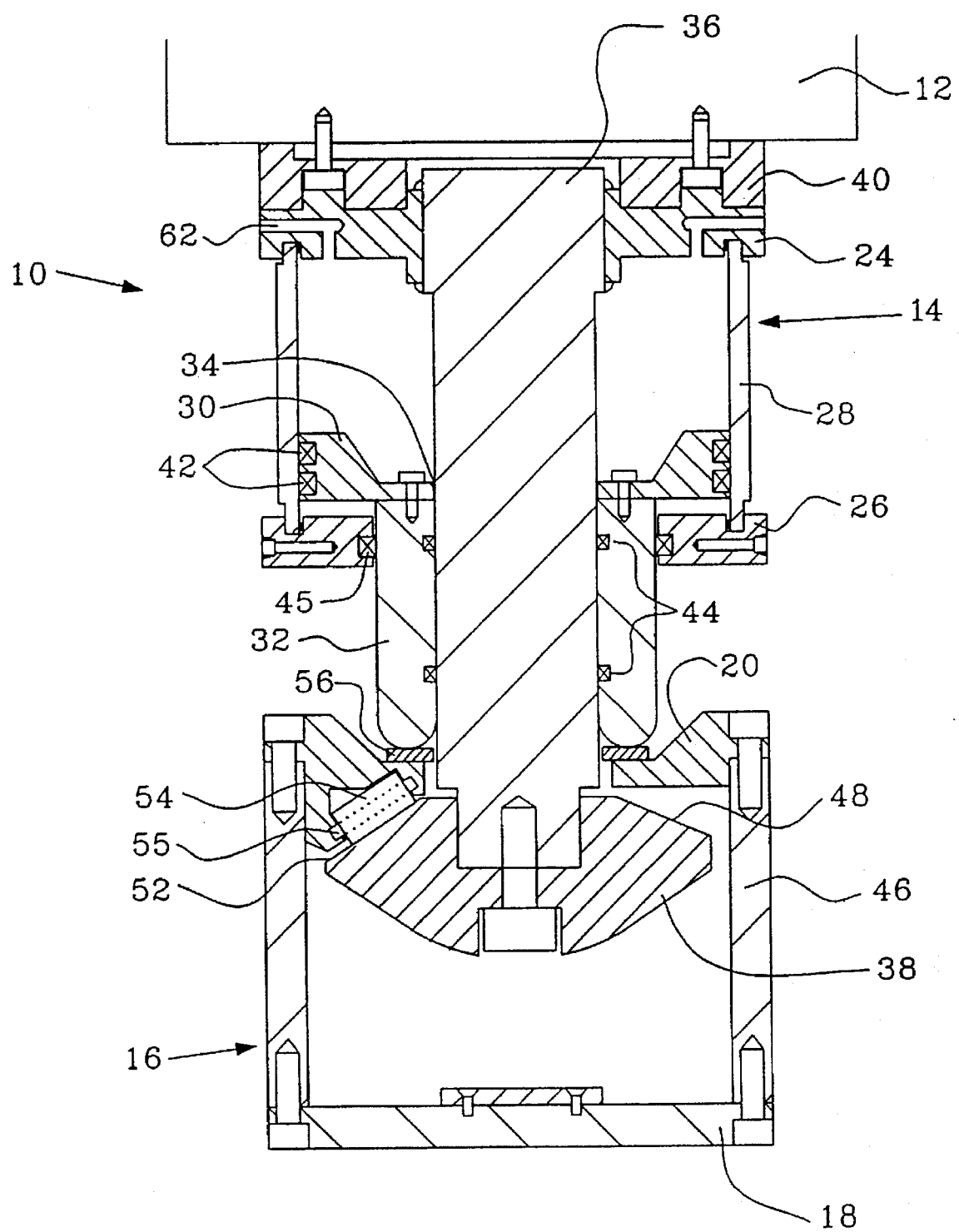
FIG. 2 is a cross-sectional view of the compliance device shown in FIG. 1.

FIG. 2 shows a cross-sectional view of the compliance control assembly 14 and the tool isolation assembly 16 illustrated in FIG. 1. The compliance control assembly 14 is preferably a fluid cylinder and most preferably a pneumatic cylinder. The cylinder includes a base plate 24, an end plate 26, a cylinder wall 28, a piston 30, and a tubular piston rod 32. The piston 30 is pierced by an axial bore 34 that accommodates an elongated shaft 36. A position locator cone 38 is affixed to the end of the shaft 36. The shaft 36 passes through the tubular piston rod 32, the axial bore 34 in the piston 30 and a bore in the base plate 24. The shaft 36 is attached to the base plate 24 which is in turn affixed to a mounting plate 40 that is used to attach the compliance device to the robot 12. A fluid seal is provided between the piston 30 and the cylinder wall 28 by piston rings 42. A fluid seal is provided between the shaft 36 and the inner walls of the tubular piston rod 32 by O-rings 44. A fluid seal is provided between the end plate 26 and the piston rod 32 by an O-ring 45.

As described above, affixed to a free end of the shaft 36 is a position locator cone 38. The position locator cone 38 is preferably enclosed by the tool isolation assembly 16 which is conveniently cylindrical in shape. The tool isolation assembly 16 includes a tool support end 18, a position locator end 20 and a tubular side wall 46. The tool isolation assembly therefore surrounds and encloses the position locator cone 38 to prevent the collection of dust or debris which could interfere with the function of the position indexes, the construction and function of which will be described in detail below.

The position locator cone 38 is preferably a robust component machined from tool steel. A bottom surface of the position locator cone is rounded to permit a maximum displacement of the tool isolation assembly to isolate the robot 12 from the reaction threes of a tool operation.

Figure 3:
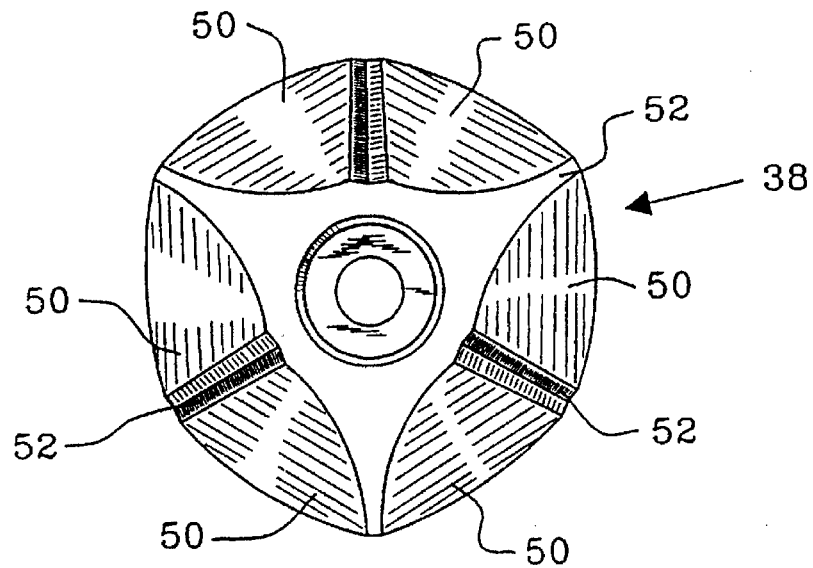
FIG. 3 is a plan view of a position locator of the compliance device shown in FIG. 2, illustrating the detent grooves that serve as position indexes to locate a predetermined home position for the device.
Figure 4:
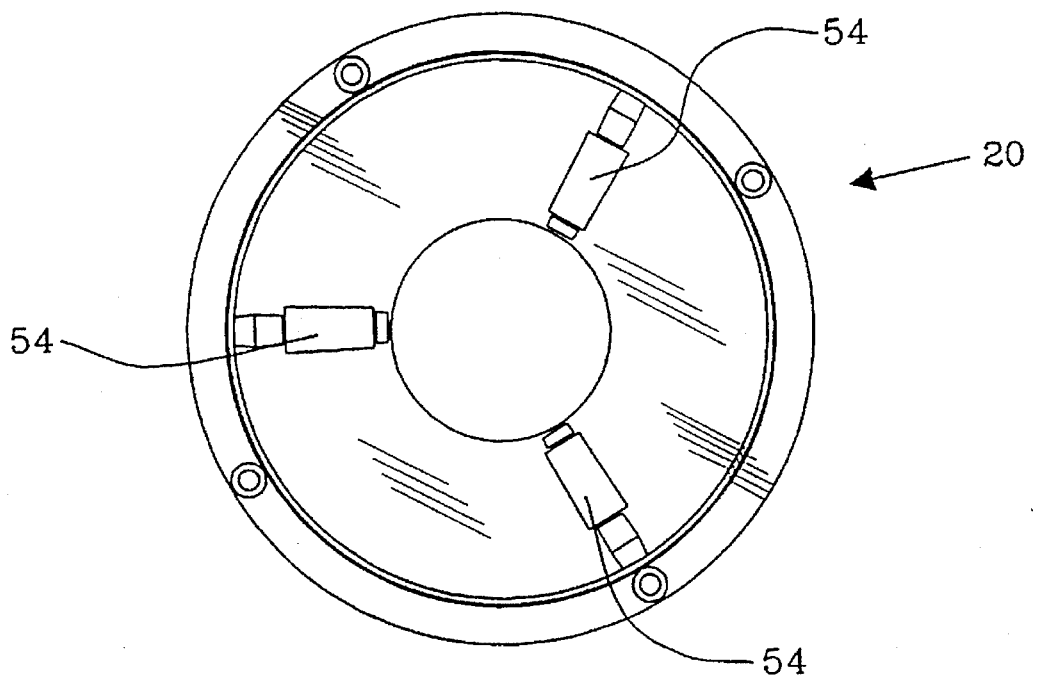
FIG. 4 is a plan view of the position locator end of the tool isolation assembly showing the rollers that serve as position indexes complementary to the detent grooves shown in FIG. 3.

As shown in FIG. 3, a top surface 48 of the position locator cone 38 is machined to include six plane surfaces 50 located in pairs on opposite sides of detent grooves 52. Mounted to the position locator end 20 of the tool isolation assembly 16 in equally spaced apart relation are rollers 54 (see FIG. 4) which are free to turn on shafts 55 (see FIG. 2). Each plane surface 50 is inclined at an obtuse angle with respect to the shaft 36 and inclined at an acute angle with respect to a line perpendicular to a centerline of each detent groove 52. The respective inclines of the plane surfaces 50 serve to center the tool isolation assembly 16 with respect to the shaft 36, and to urge the rollers 54 towards to detent grooves 52. When each roller 54 is located in a corresponding detent groove 52, the tool isolation assembly 16 is located in the home position. When air pressure is introduced through port 62 (see FIG. 2) into the fluid cylinder of the compliance control assembly 14, the tubular piston rod 32 is extended and exerts pressure against a thrust washer 56. This forces rollers 54 onto the top surface 48 of the position locator cone 38. The incline of the planes 50 and the force of the tubular piston rod 32 cause the rollers 54 to seek the respective detent grooves 52 and thereby return the tool isolation assembly 16 to the predetermined home position.

In use, the compliance device 10 is fitted with a tool, such as a riveting tool 22 (see FIG. 1) and taught the coordinates of points to be riveted in a manner well known in the art. When the tool is in a riveting position, the robot 12 signals a tool controller (not illustrated). The tool controller opens a pressurized hydraulic fluid supply valve (not illustrated) to operate a hydraulic cylinder 58 (see FIG. 1) that forces a stem 59 of the riveting tool 22 into contact with the head of a rivet (not illustrated) to upset the rivet on an anvil 60. Simultaneously, air pressure is released from the fluid cylinder of the compliance control assembly 14. This permits the tubular piston rod 32 (see FIG. 2) to be moved away from the locator end 20 of the tool isolation assembly 16. A typical riveting operation requires a tool compression pressure of approximately 16,000 pounds. That pressure generates reaction forces that may result in a combination of axial, eccentric and moment loads on the tool isolation assembly 16. When tool reaction loads are translated to the tool isolation assembly 16, the tubular piston rod 32 is forced upwardly by the tool isolation assembly 16 and the tool isolation assembly is permitted to rise, tilt, twist or rotate about the shaft 36. The robot is thereby isolated from the reaction loads induced by the tool operation. After the rivet is set, the tool controller opens the air supply to the compliance control assembly 14 and the hollow piston rod 32 is forced downwards onto the position locator end 20 of the tool isolation assembly 16. This forces the rollers 54 to seek the detent grooves 52 in the top surface 48 of the position locator cone 38 (see FIG. 2). The riveting tool is thereby returned to the home position which permits the robot to accurately locate the riveting tool at the next riveting coordinates.

It is apparent from the foregoing that the invention provides a robust compliance device which is suitable for heavy tool operations that generate significant reaction loads. This permits the automation of tooling operations such as riveting, which to date have not been successfully automated.

The specific embodiment of the invention described above is intended to be exemplary only. It will be apparent to those skilled in the art that changes and modifications may be made to the specifically described embodiment without departing from the scope or spirit of the invention.

We claim:

1. A compliance device for a robot to isolate the robot from reaction loads induced by an operation of a tool used by the robot, and to return the tool to a predetermined home position after a tool operation, comprising:

a tool isolation assembly having a tool attachment end and a position locator end, the position locator end including an aperture;

a position locator means for cooperating with the position locator end to return the tool isolation assembly to the predetermined home position, the position locator means having a first and second ends and a portion intermediate the first and second ends which passes through the aperture, the second end permitting limited movement of the tool attachment end in any direction except past the second end, and the second end having a surface adjacent the aperture which includes position index means for locating the tool isolation assembly in the predetermined home position, the position index means being cooperative with complementary position index means located on an adjacent surface of the locator end of the tool isolation assembly; and compliance control means for applying mechanical pressure on the locator end of the tool isolation assembly to force the complementary position index means to cooperatively return the tool isolation assembly to the predetermined home position after the tool operation, and for releasing mechanical pressure from the locator end of the tool isolation assembly to disengage the complementary index means and permit limited reaction movement of the tool isolation assembly during tool operations.

2. A compliance device for a robot as claimed in claim 1 wherein the tool isolation assembly comprises a cylindrical structure having closed ends, the aperture in the position locator end being an axial bore.

3. A compliance device for a robot as claimed in claim 1 wherein the position locator means comprises an elongated shaft having first and second ends, a first end of the shaft being affixed to the compliance control means, the shaft extending through the aperture in the tool isolation assembly and the second end of the shaft including a position locator cone.

4. A compliance device for a robot as claimed in claim 3 wherein a top surface of the position locator cone includes six plane surfaces arranged in complementary pairs on opposite sides of three detent grooves, the detent grooves being the position index means for locating the tool isolation assembly in the predetermined home position.

5. A compliance device for a robot as claimed in claim 4 wherein the position locator end of the tool isolation assembly has an inner surface and the inner surface includes three equally spaced-apart rollers which are supported in complementary relation to the plane surfaces on the top surface of the position locator cone, the rollers being the complementary position index means, and the rollers being at rest in the detent grooves when the tool isolation assembly is in the predetermined home position.

6. A compliance device for a robot as claimed in claim 1 wherein the compliance control means comprises a fluid cylinder having first and second ends, a bore which communicates with the first and second ends and a piston forceably reciprocally movable in the bore, and at least one piston rod for forcing the complementary position index means to cooperatively return the tool isolation assembly to the predetermined home position after a tool operation.

7. A compliance device for a robot as claimed in claim 6 wherein the at least one piston rod is a tubular piston rod and the piston includes an axial bore, the tubular piston rod and the axial bore in the piston accommodating the intermediate portion of the position locator means.

8. A compliance device for a robot to isolate the robot from reaction loads induced by an operation of a tool used by the robot, and to return the tool to a predetermined home position after a tool operation, comprising:

a fluid cylinder having an end for attachment to the robot and a free end;

a tool isolation assembly for permitting reaction movement by the tool during tool operations, the tool isolation assembly being independent of and spaced apart form the free end of the fluid cylinder;

a position locator means for returning the tool isolation assembly to the predetermined home position and having a first end rigidly affixed to the fluid cylinder, an intermediate portion that passes through an aperture in the tool isolation assembly and, a second end that permits limited movement of the tool isolation assembly in any direction except past the second end of the position locator means;

the second end of the position locator means having a surface adjacent the aperture in the tool isolation assembly, the surface including position index means for cooperating with complementary position index means on a surface of the tool isolation assembly that includes the aperture; and at least one piston rod that extends through the free end of the cylinder for applying mechanical pressure to the position locator end of the tool isolation assembly to force the tool isolation assembly into contact with the position locator means so that the position index means on the surface of the position locator means and the complementary position index means on the surface of the tool isolation assembly cooperate to move the tool isolation assembly to the predetermined home position when pressurized fluid is injected into the cylinder and the at least one piston rod is extended.

9. A compliance device for a robot as claimed in claim 8 wherein the fluid cylinder is a pneumatic cylinder.

10. A compliance device for a robot as claimed in claim 9 wherein the tool isolation assembly comprises a cylindrical structure having closed ends, the aperture in the position locator end being an axial bore.

11. A compliance device for a robot as claimed in claim 9 wherein the position locator means comprises an elongated shaft having first and second ends, a first end of the shaft being affixed to the fluid cylinder, the shaft extending through the aperture in the tool isolation assembly and the second end of the shaft including a position locator cone.

12. A compliance device for a robot as claimed in claim 11 wherein a top surface of the position locator cone includes six plane surfaces arranged in complementary pairs on opposite sides of three detent grooves, the detent grooves being the position index means for locating the tool isolation assembly in the predetermined home position.

13. A compliance device for a robot as claimed in claim 12 wherein the position locator end of the tool of support assembly has an inner surface and the inner surface includes three equally spaced apart rollers that are supported in complementary relation to the plane surfaces on the top surface of the position locator cone, the rollers being the complementary position index means, and the rollers being at rest in the detent grooves when the tool isolation assembly is in the predetermined home position.

14. A compliance device for a robot as claimed in claim 9 wherein the at least one piston rod is a tubular piston rod which is connected to a piston which includes an axial bore, the tubular piston rod and the axial bore in the piston accommodating the intermediate portion of the position locator means.

15. A compliance device for a robot, comprising:

a fluid cylinder having first and second ends, a bore that communicates with the first and second ends, a piston that is forcibly reciprocally movable within the bore, and a tubular piston rod affixed to the piston and extending through the second end of the fluid cylinder;

a tool isolation assembly for permitting reaction movement of a tool during tool operations, the tool isolation assembly being independent of and spaced apart form the second end of the fluid cylinder, and having a position locator end adjacent the fluid cylinder and a tool attachment end remote from the fluid cylinder;

a position locator for cooperating with the position locator end to position the tool isolation assembly in a predetermined home position, the position locator having a shaft with a first end that is rigidly affixed to the fluid cylinder and passes through an aperture in the position locator end of the tool isolation assembly and a cone-shaped end that permits limited movement of the tool attachment end of the tool isolation assembly in any direction except past the cone-shaped end;

the cone-shaped end of the position locator having a surface adjacent the position locator end of the tool isolation assembly, the surface including equally spaced-apart detent grooves located between inclined plane surfaces for cooperating with complementary rollers on an adjacent surface of the position locator end of the tool isolation assembly; and the tubular piston rod that extends through the second end of the cylinder contacts the locator end of the tool isolation assembly to force the tool isolation assembly into contact with the cone-shaped end of the position locator so that the detent grooves on the cone-shaped end of the position locator and the rollers on the position locator end cooperate to urge the tool isolation assembly to a predetermined home position when pressurized fluid is injected into the fluid cylinder and the tubular piston rod is extended.

16. A compliance device for a robot as claimed in claim 15 wherein the surface of the cone-shaped end of the position locator adjacent the position locator end of the tool isolation assembly includes three detent grooves located between complementary pairs of inclined planes which urge the rollers to seek the detent grooves when pressure is applied to the position locator end of the tool isolation assembly.

17. A compliance device for a robot as claimed in claim 15 wherein the tubular piston rod contacts a thrust washer on the locator end of the tool isolation assembly to facilitate rotational movement of the tool isolation assembly when the rollers seek the detent grooves.

18. A compliance device for a robot as claimed in claims 1, 8 or 15 wherein the tool is a riveting tool.

* * * * *